Figure 1:
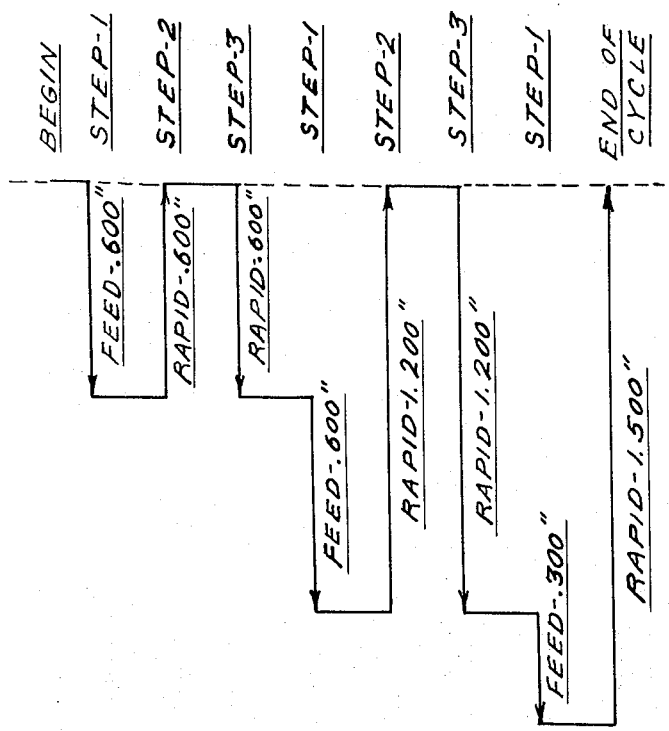

United States Patent [19]

Kreithen et al.

[11] 3,854,837

[45] Dec. 17, 1974

[54] APPARATUS AND MEANS FOR PERFORMING A METHOD FOR CONTROLLED DEEP HOLE DRILLING

[75] Inventors: Marvin L. Kreithen, Huntington Valley; John J. Lawler, Newportville, both of Pa.

[73] Assignee: Textron Inc., Providence, R.I.

[22] Filed: Feb. 23, 1973

[21] Appl. No.: 335,075

[52] U.S. Cl. ................................................ 408/17
[51] Int. Cl. .......................................... B23b 47/18
[58] Field of Search ............... 408/10, 17, 129, 705; 173/19; 318/39, 571, 603

[56] References Cited
UNITED STATES PATENTS

| | | | |
|---|---|---|---|
| 2,242,076 | 5/1941 | Jones | 408/10 X |
| 2,768,539 | 10/1956 | Wollenhaupt et al. | 408/17 X |
| 3,129,613 | 4/1964 | Bury | 173/19 |
| 3,475,997 | 11/1969 | Wohlteil | 318/603 X |

*Primary Examiner*—Andrew R. Juhasz
*Assistant Examiner*—Z. R. Bilinsky
*Attorney, Agent, or Firm*—Dorfman, Herrell and Skillman

[57] ABSTRACT

A quill is advanced or withdrawn from work using at least rates for such movement in accordance with control means for determining the direction and speed of rotation of a step motor. Sequence control means is responsive to successive inputs indicative of the end of a sequence step in order to initiate the change to the next sequence. The successive outputs resulting from the successive inputs to the sequence control means set up conditions for operation of the next sequence and, when appropriate to the sequence, actuate direction control means to modify the direction of rotation or the pulse rate control means to modify the feed pulse rate to the step motor.

18 Claims, 3 Drawing Figures

APPARATUS AND MEANS FOR PERFORMING A METHOD FOR CONTROLLED DEEP HOLE DRILLING

The present invention relates to apparatus for and means for performing a method of controlled deep hole drilling. More specifically the present invention relates to a method providing a sequence of steps to move a tool carrying quill toward and away from work at selected rates of movement. It also relates to a control device including sequencing logic for achieving a predetermined pattern of quill response in order to produce a deep hole of predetermined depth in a desired location.

In the prior art there have been mechanical means of deep hole drilling using a stepwise method of drilling to an arbitrary predetermined depth constituting part of the desired hole depth. Such methods have been employed with machines having a combination of pneumatic/hydraulic quill drives. The methods have employed analog techniques wherein a measuring rod is used to determine the drilling depths. Such techniques are cumbersome to set up and accuracy is difficult to achieve using them.

The assignee of the present invention has developed a quill drive using stepping motors to position the quill. With such a system the mechanical drilling means of the prior art is costly and unsatisfactory. The present invention provides a means of using the stepwise drilling techniques with a step motor quill drive. It also provides means of accomplishing the results of the prior art method with much less difficulty for the machine operator. Additionally the present invention uses digital techniques either wholly, or in part, to accomplish the desired results.

The present invention is not concerned with the method or apparauts for selecting the place in which to drill holes. Such apparatus exists and may be used in combination with the present invention to select successive positions, and possibly orientations, in a given piece of work at which holes are to be drilled. The present invention is concerned with the actual sequence used in drilling a deep hole at a selected location to a predetermined depth.

The method steps for a controlled deep hole drilling cycle are known and have been practiced with a mechanical analog system in the prior art. These steps consist of a down-feed from a starting point for a predetermined time or distance at a rate appropriate to drilling, a rapid traverse back to the top of the down-feed point, followed by a rapid traverse back to the point of furtherest drilling. A new down-feed of the quill at the rate appropriate to drilling is initiated at this point and continues for the same depth as the first, unless the desired hole depth is reached before the end of the down-feed period. The above sequence is repeated until the quill reaches the programmed down-position.

The present invention presumes the use of a quill, which may be of type described in U.S. Pat. application Ser. No. 369,977, assigned to the assignee of the present invention.

The present invention relates to novel means for performing the method of drilling deep holes. This means is either entirely digital, or partially digital and employs a step motor responsive to pulses from a controlled pulse source to drive the quill. Means is provided for advancing the quill a predetermined amount toward the work from a starting point at a relatively slow rate appropriate for drilling into the work. Means is provided for accumulating a count of drilling pulses representative of the hole depth drilled. Means is provided for withdrawing the quill away from the work to the starting point at a more rapid rate a distance represented by said accumulated count and for returning the quill at said more rapid return to the point of furtherest drilling advance as represented by said accumulated count. Means is provided for advancing the quill at said drilling rate said same fixed predetermined amount, unless the full desired depth of the hole is reached, and adding to the accumulated count as drilling proceeds. Means is provided for withdrawing the quill at a more rapid rate to the starting point a distance represented by the total accumulated count, if the full depth of the hole is not reached. Means is provided for repeating the sequence until the full depth of the hole is reached. Means is provided for sensing when the full desired depth is reached and withdrawing the quill to the starting point.

The control device of the present invention for deep hole drilling is for use with a machine tool employing at least a quill cooperable with a drilling tool holder for driving a tool in the tool holder into, or away from, work, quill step motor means for moving said quill to drive a tool, and motor control means for said quill step motor through which direction and speed control of said quill step motor are obtained. A pulse generator is connected to said motor control means for generating pulses for moving said step motor. A pulse rate control associated with the pulse generator determines rates of pulse generation including a selected rate for drilling and at least one more rapid rate. Direction control means are provided for determining the direction of rotation of said step motor. Sequence control means are provided for actuating in predetermined sequence the direction control means to modify direction of rotation and for actuating in predetermined sequence the pulse rate control to modify the feed pulse rate to the step motor. Pulse counter means are provided to count pulses driving said step motor. Count responsive means actuated by predetermined count conditions, in turn, actuate the sequence control means to produce the predetermined sequence of operation of said step motor.

For a better understanding of the present invention reference is made to the following drawings in which FIG. 1 is a diagram of the program or sequence of steps, in a deep hole drilling method in accordance with the present invention.

Figure 2:
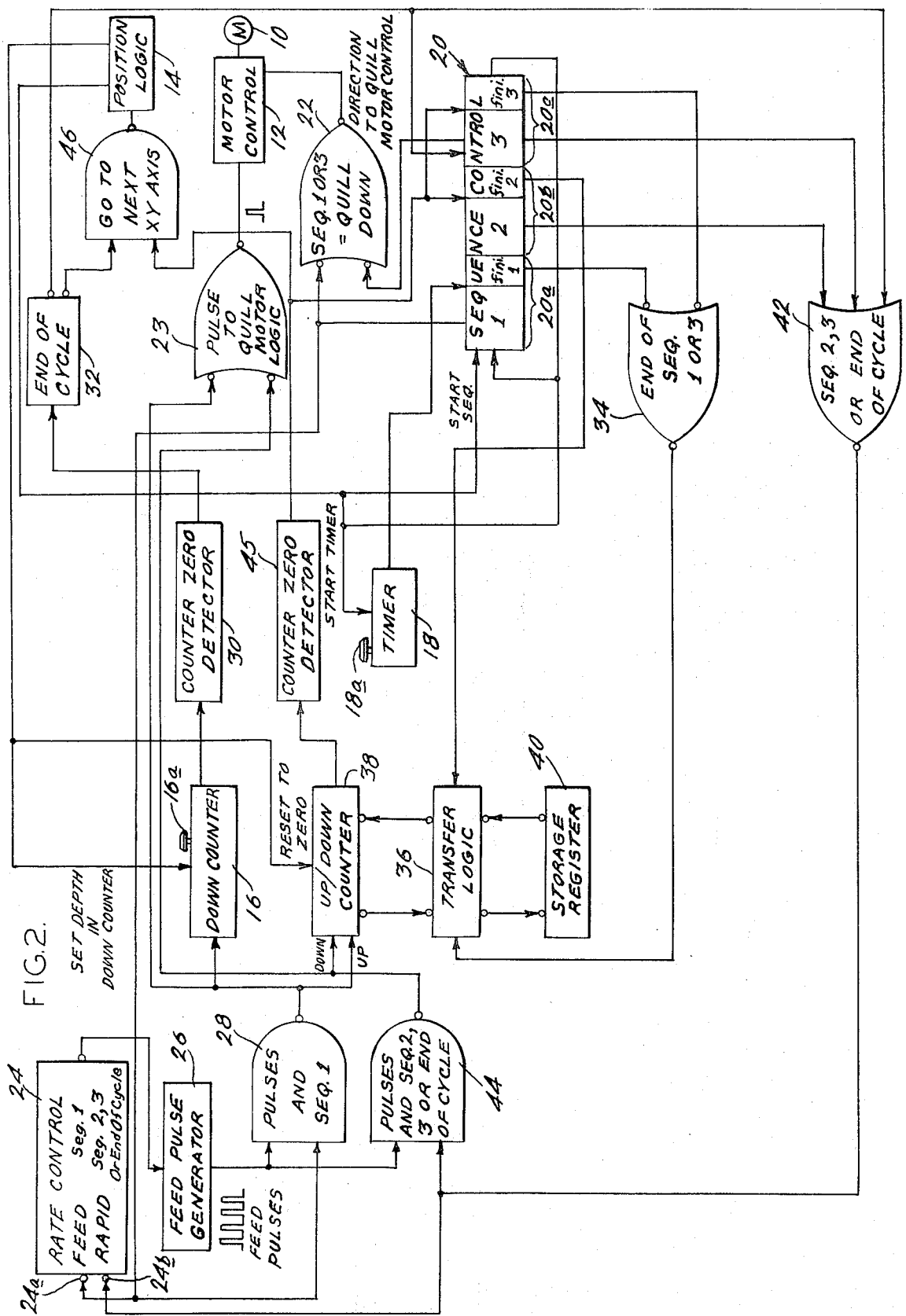
Figure 3:
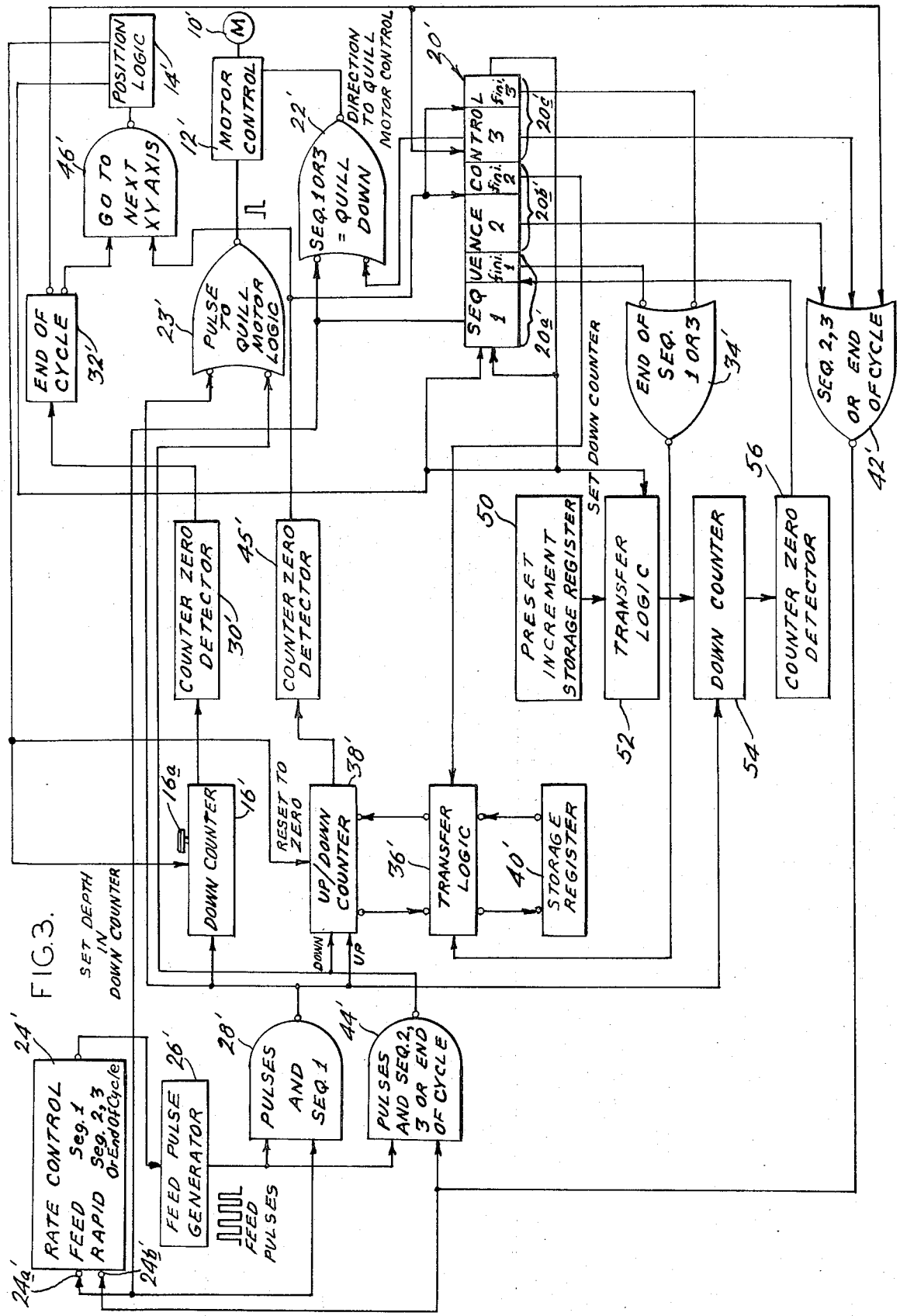

FIG. 2 is a block diagram showing a system or apparatus, using analog and digital means in accordance with the present invention, and FIG. 3 is a similar block diagram showing a modified system employing only digital means in accordance with the present invention.

FIG. 1 illustrates the method of drilling deep holes in accordance with the present invention. It represents the steps which are taken in drilling and for the purpose of illustration, selects a hole of total depth of 1.500 inches. The presumption is that other machine tool control logic will place the drill in position above the work surface with minimum clearance and that the drilling process will be one of successive steps of drilling into the work to a fixed predetermined depth which may be a depth arbitrarily selected, or selected more appropriately in accordance with needs of tool and work cooling. In the illustration shown, the amount drilled at each drilling step is approximately or exactly 0.600 inch depending whether determined by a preset timer or a counter, as will be described hereafter. As the diagram shows, drilling occurs moving the quill toward the work at a speed appropriate for drilling for 0.600 inch and then rapidly retracting the drill to its starting point. Thereafter the drill is rapidly fed back into the work to the point where drilling terminated and then slowed to drilling speed to drill another section 0.600 inch depth. At the selected depth the drill is then rapidly withdrawn back to the starting point and on a subsequent step rapidly moved back to the drilling depth. Finally, drilling proceeds, but before the 0.600 inch can be reached the full depth of 1.500 inches is reached after 0.300 inch and the drill is rapidly retracted from that point to the starting point.

If the hole depth had been less than 1.200 inches drilling would have stopped in the course of the second drilling step instead of in the course of the third. If the hole were deeper than 1.800 inches the third step would have continued to its end and a fourth cycle would have been initiated.

The following table, making reference to apparatus in the system of FIG. 2, describes stepwise what happens in each step of the method:

|  | down counter 16a | up/down counter 38 | storage register 40 |
| --- | --- | --- | --- |
| Start | 1.500 | .000 | .000 |
| during step 1 | —count pulses | +count pulses | .000 |
| end of step 1 | .900 | .600 | .600 |
| during step 2 | .900 | —count pulses | .600 |
| end of step 2 | .900 | .000 | .600 |
| beginning of step 3 | .900 | .600 | .600 |
| during step 3 | .900 | —count pulses | .600 |
| end of step 3 | .900 | .000 | .600 |
| beginning of step 1 | .900 | .600 | .600 |
| during step 1 | —count pulses | +count pulses | .600 |
| end of step 1 | .300 | 1.200 | 1.200 |
| etc. | | | |

Several observations should be made so that the diagram of FIG. 1 will not be misleading. The diagram is meant to show the steps separated in time, although it will be appreciated by one skilled in the art that drilling will repeatedly occur along the same axis in the course of drilling a deep hole. The function of spreading the steps out to separate each of the steps from one another is to more clearly explain the sequence of steps. Of course, the axis is not truly a time axis since the steps are shown as taking no time whereas in practice step 1 takes longer because the downward movement of the quill is slower than the rapid movement upward in step 2 followed by the rapid movement downward in step 3. As a practical matter only two speeds need be used, but more than two speeds could be used conceivably within the spirit and scope of the present invention.

Referring next to FIG. 2, one control device for employing the method of FIG. 1 or other similar methods is illustrated in block diagram form. The purpose of the control device is control through motor control 12 of quill motor 10, which in preferred embodiments is a step motor having connections enabling it to rotate in either direction as selected and rotate at speeds determined by the rate of pulses are fed to it. The conventional step motor control 14 in this case responds to an input to reverse the normally upward motion of the quill so that it moves downwardly. A preferred type of motor moves an incremental rotational step for each pulse fed. Suitable step motors have been manufactured, for example, by Sigma Instruments, Inc., and others, for use in machine tool and similar applications.

In the present application the step motor is used to drive a quill, the part of a drilling head moving the tool toward and away from work, for example the quill of U.S. application Ser. No. 369,977. The machine tool involved may be a simple drill press, or it may be a machine with a movable work supporting table. For example, such a movable table may be positionable at successive locations at determined X and Y coordinates in a horizontal plane for boring vertical holes in work at those locations. The table may also be more complex and it or the boring head may be tiltable to permit boring of holes at angles. The invention also applies to other than vertical boring orientations and applications other than boring. For example, the invention might be employed to advance and retract a tube or probe from work at at least two different rates, all in accordance with some programmed pattern of operation.

The logic which controls original positioning of the tool before the drilling sequence appears in FIG. 2 as position logic 14 is not part of the present invention, but receives an output from the system of the present invention when each drilling cycle is completed and positions the drill for drilling the next hole in accordance with a predetermined schedule. When it reaches the next programmed position it may provide outputs to set the desired depth of that particular hole as called for in drilling program by setting a predetermined depth count in the down counter 16, by resetting to zero the up/down counter 38, by resetting the timer 18 to zero and initiating the sequence control logic 20.

The timer 18 in this case acts upon the sequence control generally designated 20 to time for a predetermined time the first step of the sequence which control the drilling time for the down feed. The sequence control for example may consist of a chain of flip-flop devices very much in the nature of a shift register such that, when portion 20a representing sequence 1 is turned on, it generates an output to OR gate 22 in order to affect the direction of the quill through motor control 12 by reversing the direction of motor 10. The same output is fed to an input 24a of a rate control device 24 which acts upon the feed pulse generator 26 to produce relatively slow output pulses. By virtue of simultaneous appearance at the terminls of AND gate 28 of the signal from stage 20a and sequence control 20 and the pulses, the gate 28 turns on to permit passage of the slow pulses at an appropriate drive rate for the motor through the OR gate 23. The motor then drives the quill downwardly at an appropriate slow rate of speed for drilling. The pulse output through gate 28 also passes through down-counter 16 and each pulse counts down one. The pulse output through gate 28 also passes through up/down counter 38. The initial down-counter count may be retained in an associated register for repeated use in drilling many holes or may be set and reset as desired by normal control means 16a. In either event the count is retained to be set automatically by the position logic 14 when the drill reaches a starting position as previously described. When the desired depth of hole is reached the counter 16 will have counted down to 0 and the counter zero detector 30 will then trigger the end of cycle mechanism 32 in an operation which will be described hereafter.

Pulses continue to flow until the timer 18 times out in accordance with the time manually set by dial 18a. At the end of the selected time period completing sequence 1, the state of stage 20a of the sequence control is changed by the timer providing an output to OR gate 34, which sets transfer logic 36 into a state which transfers the count which has been accumulated in up-down counter 38 to storage register 40. The count which represents the accumulated distance from the top of the drilling stroke, is also retained in up/down counter 38. The change of state also triggers sequence 2, setting stage 20b of sequence control 20 into a state which continuously generates an output through OR gate 42. This output acts upon the rapid terminal 24b of rate control 24 to cause feed pulse generator 26 to generate pulses at a more rapid rate suitable for step 2 of the process shown in FIG. 1. Since sequence 1 is turned off, the signal is removed from AND gate 28 and pulses no longer pass through that gate. However, the pulses are applied to AND gate 44, to the other terminal of which the output of OR gate 42 is applied. As a consequence the more rapid rate of pulses passes through the OR gate 23 to motor control 12 to drive motor 10 at a more rapid rate. These pulses are also employed to count down up-down counter 38. During this period the signal applied to the direction terminal of the motor control 12 through the quill down OR gate 22 has been removed so that the direction of the motor reverses from the first sequence so that pulses will then drive the quill upwardly away from the work.

When the up/down counter 38 is counted down to 0 the counter zero detector 45 will produce an output to change the state of stage 20b of the sequence control. The same output would change the stage of stage 20c, but that section has not been set into active condition at the time, and therefore, it is ineffective. Similarly, the signal imposed on AND gate 46 is the sole signal since the end of cycle signal does not appear and therefore the output from that gate telling the position logic to move on is not present. However, when the second portion of sequence control has its state changed back an output to the transfer logic 36 causes that logic to place the count in the storage register 40 back into the up-down counter so that therefore that counter is counted up and ready to be counted down in the next sequence 3, which is set at the same time sequence 2 is discontinued.

The output from stage 20c of the sequence control 20 acts on OR gate 22 to produce a signal on the direction terminal of the motor control 12 to again reverse the direction of the quill motor to drive the quill downwardly toward the work. Once again another output from stage 20c is applied to OR gate 42, which, as previously, causes the rate control 24 to be placed on the rapid pulse rate to actuation at terminal 24. Again, feed pulses are generated a rapid rate by feed pulse generator 26 so that an output applied to input terminal of AND gate 44, together with the output directly from gate 42 the output of gate 44 again provides pulses through OR gate 23 to the motor control 12 to drive the step motor at a rapid speed to move the quill rapidly in the downward direction. The output is also applied to up-down counter 38 to count down the count set from the storage register. When the counter zero detector 45 again detects a 0, the output resets stage 20c of the sequence control terminating step 3 of the sequence. The contents of the storage register 40 are once again transferred into the up-down counter 38 so that up-down counter 38 can begin the next sequence set at a count which represents the depth of the hole already drilled. Portion 20a of the sequence control is also reset so that sequence step 1 may be repeated.

As sequence 1 is repeated, gate 28 is again activated and the down-counter counted further down, the steps are repeated precisely as previously under the control of the sequence control. However, it should be observed that a count representative of the depth of the hole already drilled is already in the up/down counter 38 when step 1 of the sequence begins so that as depth is added to the hole the count will be increased. Therefore, the zero detector 45 will not detect zero on the second step of the sequence until sufficient pulses have been counted to drive the quill up to its starting position from the lower level on the second cycle. The same thing is true of the third and subsequent cycles.

When the boring finally reaches the predetermined hole depth the pulses which have passed through AND gate 28 to count down down-counter 16 should equal the counter setting and the counter should be at 0 so that counter zero detector 30 will trigger the end of cycle device. This will cause a signal to be applied to OR gate 42 which acts on rate control 24 to cause rapid withdrawal, generating pulses for this purpose at generator 26 to be applied to AND gate 44. The end of cycle signal 32 also triggers the sequence control to the third condition so that the quill is withdrawn from the work, as in any sequence 3. This time, however, in addition to the signal output at counter zero detector 45, when the quill is returned to its starting position there is an end of cycle on AND gate 46 which produces an output telling the position logic to go to the next X, Y axis position, or whatever instructions are provided within the position logic.

Referring now to FIG. 3, it will be seen that the system is quite similar to that of FIG. 2, with the exception that the timer 18 is omitted. Since the system is specifically different, corresponding parts which function the same have been shown having corresponding numbers with the addition of primes thereto. In this system however a preset increment storage register 50 contain count necessary for the first drilling, as opposed to timing it. This register is connected by transfer logic 52 to a down-counter 54 which, at the beginning of sequence 1, transfers the preset count in register 50 to the down-counter in response to a setting pulse from the position logic 14. Likewise a setting pulse from the sequence control is generated at the end of sequence 3. During each first step of the sequence, in the course of drilling, down counter 54 counts down from the present count as pulses are emitted from gate 28'. When the downcounter 54 reaches 0, zero detector 56 indicates the end of sequence 1 and a signal is imposed upon sequence control 20' terminating sequence 1 and indicator sequence 2.

In other respects the system of FIG. 3 operates exactly as that of FIG. 2 with corresponding portions operating in similar manner.

Two embodiments of the system for controlling deep hole drilling in accordance with the method described, or in accordance with some other method involving similar types of steps have been described.

One modification has been described and other modifications will occur to the man skilled in the art. All such modifications within the scope of the claims are intended to be within the scope and spirit of the present invention.

We claim:

1. The means for performing a method of drilling deep holes using a step motor drive quill comprising
   a pulse rate control for supplying pulses to the step motor providing at least two pulse rates, a slower rate for drilling and a faster rate for advance to work, withdrawal and reinsertions of the drill,
   a direction control controlling the direction of rotation of the step motor,
   a sequence control in which a predetermined pattern of drilling a hole is established and which at appropriate times acts upon the direction control and the pulse rate control to change direction and change pulse rates, respectively, and
   position control consisting of at least two counters responding to pulses from the step motor and including
   a down counter counting cumulatively actual hole depth achieved from pulses at the slow rate,
   an up/down counter counting pulses down as positive and pulses up as negative and being capable of modification in accordance with program from the sequence control whereby
   the sequence control determines the order in which action occurs,
   the step motor advances the quill a predetermined amount into the work from a starting point at said slower rate appropriate for drilling into the work,
   both counters accumulate a count of pulses used to drive said step motor representative of the hole depth drilled until a predetermined depth is reached,
   the sequence control reverses direction and speed of the step motor for withdrawing the quill away from the work,
   the up/down counter counts pulses driving the motor to the starting point at the more rapid rate a distance represented by said accumulated count,
   at the start point the sequence control reverses motor direction for returning the quill at said more rapid rate to the point of furtherest drilling advance as represented by said accumulated count,
   at the furtherest drilling advance the sequence control changes speed for advancing the quill at said drilling rate adding to the accumulated count in the counters as drilling proceeds until either a predetermined depth or the full desired depth of the hole is reached,
   the sequence is repeated adding a predetermined drilling depth each cycle until full hole depth is achieved, and
   when the full desired depth is reached by comparison with the down counter the quill is withdrawn to the starting point.

2. The means for performing a method of drilling deep holes of claim 1 in which the means for determining when the full desired depth is reached is a count comparator which compares the accumulated count representative of actual hole depth with a count representative of desired hole depth.

3. The means for performing a method of deep hole drilling of claim 1 in which the predetermined amount toward the work at a relatively slow rate is determined by means which includes a timer for timing out the period that it takes to drill the desired predetermined amount at said relatively slow rate appropriate for drilling.

4. The means for performing a method of drilling deep holes of claim 1 in which the predetermined amount toward the work at a relatively slow rate is determined by means which includes counter means for counting pulses used to drive said step motor when proceeding at a relatively slow rate appropriate for drilling, and means for terminating drilling when the count reaches a predetermined level.

5. The means for performing the method of claim 1 in which only two rates of advancing and withdrawing the quill are produced by two pulse rates.

6. A deep hole drilling control device for a drilling machine tool employing at least a quill for driving a drill into or away from work and movable on the frame of the machine tool for this purpose, quill step motor means for moving said quill toward and away from work, and motor control means for said quill step motor through which direction of movement and speed of said quill step motor are obtained, comprising
   a pulse generator connected to said motor control means for generating pulses for moving said step motor,
   pulse rate control means associated with the pulse generator to determine the rate of pulse generation including a selected rate for drilling and at least one more rapid rate,
   sequence control means for actuating the control means in predetermined sequence to modify direction of rotation and to modify by the pulse rate control means the feed pulse rate to the step motor,
   pulse counter means to count pulses driving said step motor in each step of the sequence, and
   count responsive means actuated by predetermined count conditions to actuate the sequence control means to produce a predetermined sequence of operation of said step motor.

7. The deep hole drilling control device of claim 6 in which timer means is employed to time the drilling step of each sequence and to terminate that step and initiate the next step of the sequence through the sequence control means.

8. The deep hole drilling control device of claim 7 in which the timer means is started by position logic when the tool is in proper drilling position or by the sequence control as each sequence terminates and a new sequence is to begin.

9. The deep hole drilling control device of claim 8 in which the timer may be selectively set for any desired drilling period.

10. The deep hole drilling control device of claim 6 in which the period in the drilling sequence is determined by comparison of a pulse count with a predetermined count representing the desired drilling increment.

11. The deep hole drilling control device of claim 10 in which the desired count is stored in a storage register and transferred into a down-counter upon the occurrence of the beginning of a sequence either from initial tool positioning or repetition of the sequence and counter zero detection means is provided to determine when the down-counter has been counted to zero by the pulses driving the quill motor, said counter zero detector acting to terminate the drilling sequence and initiate the next sequence through the drilling control logic.

12. The deep hole drilling control device of claim 6 in which a counter counting only the drilling pulses is provided and in which drilling operation is terminated at any time in the sequence when a predetermined count is reached by said counter.

13. The deep hole drilling control device of claim 12 in which gate means is provided to provide the counter only with pulses during the drill step of the sequence, the counter is a down-counter, means is provided to set the counting at a predetermined count representative of total desired hole depth and counter zero detector means determines when the counter has reached 0 and produces a signal to end the drilling and return the quill to the starting position.

14. The deep hole drilling control device of claim 13 in which the count is put into the down-counter from a register upon suitable signal from a drill position logic indicating that the drill is in place ready to begin drilling.

15. The deep hole drilling control device of claim 12 in which the count is set into the down-counter by manual means.

16. The deep hole drilling control device of claim 6 in which an up-down counter is provided with suitable gating means allowing it to be counted up by drilling pulses and counted down by other pulses and a counter zero detection device causes an output to terminate the sequence of rapid retraction.

17. The deep hole drilling control device of claim 16 in which a storage register and transfer logic are provided whereby down counts may be accumulated in a storage register and transferred back into the up/down counter at the end of the sequence when the drill is withdrawn in order to permit that count to be counted down to zero as the drill is being rapidly reinserted prior to drilling.

18. The deep hole drilling control device of claim 17 in which the storage register has its storage count transferred back to the counter at the end of each drill withdrawal by virtue of a suitable signal to the transfer logic from the sequence control and in which all up-counts pass to the storage register so that it accumulates the total drilled depth of the hole in its memory.

* * * * *